May 17, 1938.　　　J. D. KARLE　　　2,117,611
SPROCKET DRIVEN BELT
Filed Jan. 27, 1937
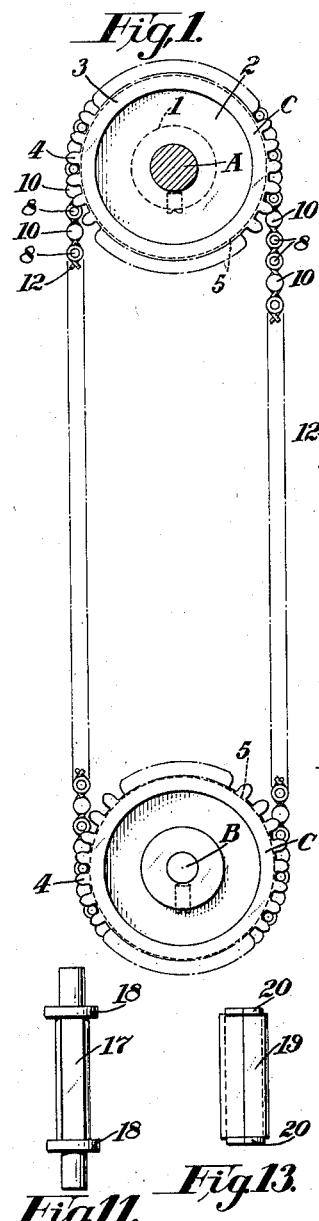
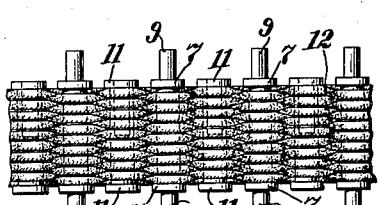
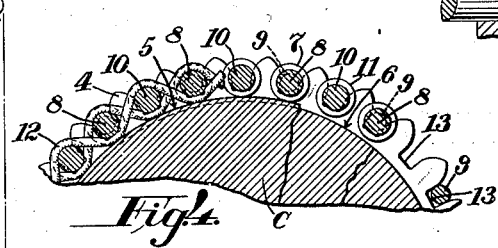
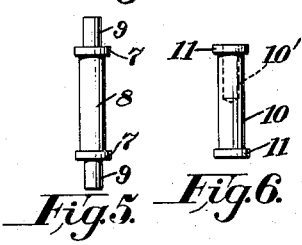
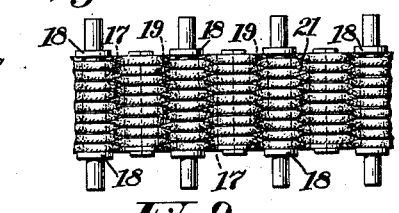
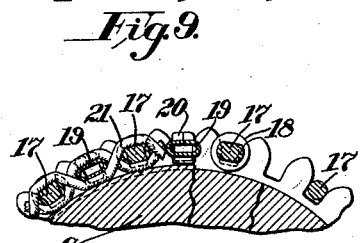
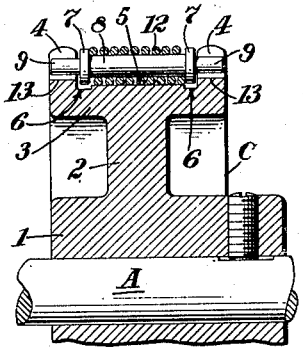
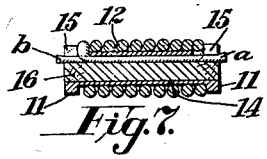
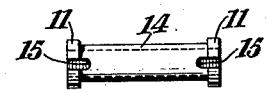
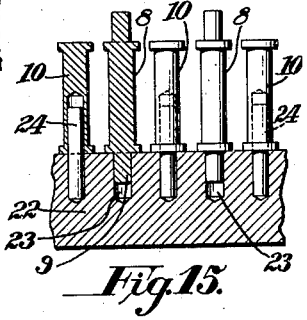
Inventor
John D. Karle
Witness:
John H. Cave
By Henry J. Miller
Attorney Patented May 17, 1938

2,117,611

UNITED STATES PATENT OFFICE 2,117,611

SPROCKET-DRIVEN BELT

John D. Karle, Roselle Park, N. J., assignor to The Singer Manufacturing Company, Elizabeth, N. J., a corporation of New Jersey Application January 27, 1937, Serial No. 122,495

5 Claims. (Cl. 74—245)

This invention relates to power transmission belts, more particularly of the sprocket-driven type designed to connect two shafts in positively timed or non-slipping relation to one-another, and has for an object to provide a sprocket-driven belt which is simple, strong and durable in construction, light in weight, inexpensive to manufacture, quiet running at high speeds, and which is particularly well adapted to connect the upper and lower shafts of a high-speed sewing machine.

With the above and other objects in view, as will hereinafter appear, the invention comprises the constructive features, combinations, and arrangements of parts hereinafter set forth and illustrated in the accompanying drawing of a preferred embodiment of the invention, from which the several features of the invention and the advantages attained thereby will be readily understood by those skilled in the art.

Referring to the drawing, Fig. 1 is a view, in elevation, of a sprocket-driven belt embodying the invention. Fig. 2 is a radial section through one of the sprockets with the belt thereon. Fig. 3 is a face view of a portion of the belt. Fig. 4 is a section taken lengthwise of a portion of the belt in engagement with a sprocket. Fig. 5 is a plan view of one of the sprocket-engaging cross-bars. Fig. 6 is a plan view of an intermediate cross-bar. Fig. 7 is a longitudinal section through a special one of the intermediate cross-bars showing the disposition of the beginning and finishing ends of the belt-cord. Fig. 8 is a plan view of the special cross-bar shown in Fig. 7. Fig. 9 is a face view of a modified form of belt construction. Fig. 10 is a longitudinal section through the belt of Fig. 9, applied to a sprocket. Figs. 11 and 12 are, respectively, plan and transverse sectional views of a driving cross-bar of the form of belt shown in Fig. 9. Figs. 13 and 14 are, respectively, plan and transverse sectional views of a non-driving cross-bar of the form of belt shown in Fig. 9, and Fig. 15 is a fragmentary sectional view of a fixture used in making the belt.

A and B represent the upper and lower shafts of a high-speed sewing machine. Fixed to the shafts A and B are sprockets C, C of similar construction, each comprising a hub 1, web 2 and rim 3 having the spaced toothed edge-flanges 4 and intermediate cylindrical belt-face-engaging surface 5. The sprockets are preferably formed between the toothed flanges 4 and the belt-face-engaging surface 5 with clearance grooves 6, 6 for the flanges 7, 7 of the preferably truly cylindrical cross-bars 8 of the belt which have coaxial terminal studs 9 adapted to engage the toothed flanges 4 of the sprockets C.

Alternating with the studded cross-bars 8 are the non-studded cross-bars 10 having end flanges 11; the intermediate cross-bars 10 being of the same size and shape as the studded cross-bars 8 with the studs 9 omitted.

The cross-bars 8 and 10 are connected together, in alternation, in an endless circuit to form the belt by an interwoven winding of flexible non-metallic strip material 12, preferably a textile cord, in a single length which passes sinuously over and under in contact relation with successive cross-bars in its several courses around the circuit; the total number of cross-bars being an odd number so that successive courses of the cord will pass alternately over and under in top-and-bottom contact with any given cross-bar which, being truly cylindrical, may turn within its woven cord envelope and evenly distribute the wear on the terminal studs 9 circumferentially of the latter.

Preferably, the cords at the inner face of the belt rest upon the cylindrical surfaces 5 of the sprockets C, so that the studs 9 are prevented from striking the bottom walls 13 between the sprocket teeth. This provision insures a particularly quiet running belt; it being understood that the studs 9 and sprocket teeth 4 retain the shafts A and B in a positively timed non-slipping relationship. The winding of cord provides a cord-connected series of non-metallic supporting pockets for the power-transmitting cross-bars which overcomes the possibility of a relative timing-destroying slippage between the cross-bars and cord and yet permits the cross-bars to adjust themselves to the sprocket-teeth and equalizes the loads on the cross-bar studs.

The inside faces of the flanges of the cross-bars hold the cords from slippage transversely of the belt. The outside faces of such flanges position the cross-bars between the toothed flanges of the sprockets and control the lateral position of the belt relative to the sprockets thereby protecting the edge-cords from abrasion.

The beginning and finishing ends of the cord 12 may be taken care of as shown in Figs. 7 and 8. A special tubular cross-bar 14 of the same size and shape as an intermediate cross-bar 10 is used. This cross-bar 14 has cord-end-admission slots 15 cut through its flanges 11. The beginning end $a$ and finishing end $b$ of the cord 12, Fig. 7, pass through the slots 15 to the inside of the tubular member 14 and longitudinally in opposite directions within the member 14 where they may be frictionally held by the wedge-pin 16.

In the modified form of belt-construction shown in Figs. 9 to 14, inclusive, the studded cross-bars 17 are flattened on opposite sides between the flanges 18. The intermediate cross-bars 19 are of flattened tubular form; being bent to such form from sheet metal blanks having wing portions which are bent to form end flanges 20. The cord 21 is interwoven with the members 17 and 19 in the same manner as previously described.

The belt may be readily manufactured by providing a suitable fixture for holding the cross-bars in properly spaced upstanding parallel relation as the cord is interwoven therewith. Such a fixture may be in the form of a disk 22 having a circular series of holes 23 each to receive a stud 9 of a cross-bar 8 and intervening pins 24 to receive the intermediate cross-bars 10 each of which has a hole 10', Fig. 6, therein to fit its holding pin.

It is of course obvious that it is not necessary to provide all of the cross-bars with terminal sprocket-tooth-engaging studs, although this may be done if it is desired to further strengthen the driving engagement between the belt and sprockets.

It will be seen that the present belt is a plain woven structure of which the power-transmitting cross-bars are weft-bars and the flexible strip is a warp-strip which progresses continuously around and around the endless circuit of weft-bars.

This invention is not to be understood as limited to the specific materials, details of construction and arrangements of parts shown and described as various modifications may obviously be made by those skilled in the art within the spirit of the invention.

Having thus set forth the nature of the invention, what I claim herein is:—

1. An interwoven sprocket-driven belt comprising an odd number of rigid parallel cross-bars having end flanges and arranged in an endless circuit, and a flexible strip woven over and under said cross-bars and passing a plurality of times around the circuit of cross-bars, certain of said cross-bars having coaxial sprocket-tooth-engaging studs extending in opposite directions beyond said flanges and others of said cross-bars being non-studded, one of said non-studded cross-bars being hollow and having admission-openings at its ends for the beginning and finishing ends of the flexible strip, which are disposed within said hollow cross-bar, and means to hold said strip ends within said hollow cross-bar.

2. An interwoven sprocket-driven belt comprising an odd number of parallel power-transmitting cross-bars having end flanges and arranged in an endless circuit, and a strip of flexible material passing sinuously over and under in top and bottom contact relation with said cross-bars and passing a plurality of times around the circuit of cross-bars, certain of said cross-bars having coaxial sprocket-tooth-engaging studs extending in opposite directions beyond said flanges, and said strip externally enveloping the portion of each cross-bar between its end flanges.

3. The construction set forth in claim 2 in which the cross-bars are truly cylindrical between the end flanges.

4. The combination with a pair of sprockets having cylindrical belt-face-engaging surfaces and toothed flanges, said sprockets being grooved between said flanges and belt-face-engaging surfaces, of a belt comprising a plurality of courses of longitudinally extending textile cord material and power-transmitting cross-bars with which said courses are interwoven, said cross-bars having end flanges received in said grooves, certain of said cross-bars having terminal studs which engage the toothed flanges of said sprockets.

5. An interwoven sprocket-driven belt comprising a series of parallel power-transmitting weft-bars having end-flanges and arranged in an endless circuit, and a flexible warp-strip woven sinuously over and under in top and bottom contact relation with said weft-bars and passing a plurality of times around the circuit of weft-bars, certain of said weft-bars having coaxial sprocket-tooth-engaging studs extending in opposite directions beyond said end-flanges, and said warp-strip externally enveloping the portion of each weft-bar between its end-flanges.

JOHN D. KARLE.